United States Patent [19]
Duchene et al.

[11] 4,156,559
[45] May 29, 1979

[54] ELECTROLYTIC DISPLAY CELL

[75] Inventors: Jacques Duchene, Grenoble; Robert Meyer, Gieres, both of France

[73] Assignee: Commissariat a l'Energie Atomique, Paris, France

[21] Appl. No.: 807,268

[22] Filed: Jun. 16, 1977

[30] Foreign Application Priority Data

Jun. 22, 1976 [FR] France ............... 76 18919

[51] Int. Cl.² .................................................. G02F 1/01
[52] U.S. Cl. ................................................... 350/363
[58] Field of Search ...................... 350/363, 357, 359

[56] References Cited
U.S. PATENT DOCUMENTS

| | | | |
|---|---|---|---|
| 3,839,857 | 10/1974 | Berets et al. | 350/357 |
| 3,995,940 | 12/1976 | Guyon et al. | 350/363 |

*Primary Examiner*—James W. Davie
*Attorney, Agent, or Firm*—Sughrue, Rothwell, Mion, zinn and Macpeak

[57] ABSTRACT

An electrolytic display cell of the type comprising an electrolyte containing a metallic salt dissolved in a solvent, two parallel plates whereof one is covered by a semi-transparent electrode and whereof the other supports a counter-electrode, the electrode and counter-electrode being connected to the positive and negative poles of a d.c. voltage source via a switch permitting the connection of each pole to any one of the electrodes, the display being obtained by connecting the electrode to the negative pole of the source and the erasing by connecting the electrode to the positive pole, wherein the solvent is an organic solvent and the salt a silver halide.

4 Claims, 1 Drawing Figure

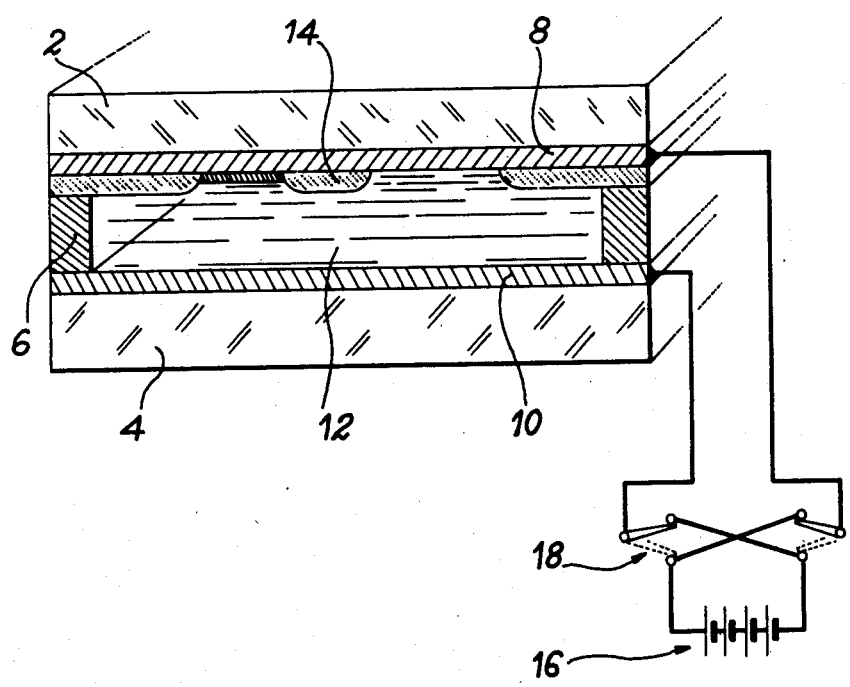

ELECTROLYTIC DISPLAY CELL

BACKGROUND OF THE INVENTION

The present invention relates to a electrolytic display cell.

An electrolytic display cell comprises an electrolyte inserted between two electrodes of appropriate shapes, at least one of which is transparent. Generally the electrolyte contains a metallic salt. A voltage source raises the electrodes to given potentials in order to bring about either the deposition by electro-chemical reduction of a metal coating onto one of the electrodes which causes the display of a symbol or the re-dissolving of said metal coating which causes the disappearance of the displayed symbol.

In a display cell of this type it is important to keep the electrolyte composition constant throughout the life of the cell. In particular the metallic ion concentration must remain substantially constant, even in the case of a slight unbalance between the dissolving times and the deposition times of the metallic coating.

This stability of the electrolyte composition is difficult to obtain because besides said oxidation and electro-chemical reduction reactions used for the deposition and dissolving of the metallic coating, under the action of voltage surges parasitic secondary reactions lead to stable bodies which gradually contaminate the electrolyte.

To obviate the effect of these secondary reactions, it has been proposed to carefully control these surge voltages which appear at the end of dissolving the metallic coating and to control the operating times, particularly involving the elimination of the erasing voltage as soon as dissolving is completed.

However, such processes do not eliminate the fault at its source and merely make it possible to reduce its effects by decreasing its probability of occurrence. In addition, they require complex means for controlling the times and voltages applied making them unsatisfactory.

BRIEF SUMMARY OF THE INVENTION

The problem of the present invention is to provide a cell where the risks of electrolyte degradation are eliminated without it being necessary to take special precautions at the end of dissolving.

This problem is solved by using a special electrolyte comprising a silver halide, whereby the latter is preferably silver iodide or bromide.

Preferably the electrolyte also comprises a supporting salt which can be an alkali bromide or iodide.

The silver iodide and bromide have already been used in electrolytic display cells but under different conditions. Reference can be made, for example, to U.S. Pat. No. 3,245,313 entitled "Light modulating means employing a self-erasing plating solution" granted on Apr. 12th, 1966. In these cells re-dissolving does not take place by electro-chemical means but instead by a chemical reaction. In order to remove the silver coating deposited on the electrode, the latter is isolated from the voltage source and the electrolyte composition is chosen in such a way that it has the property of being oxidising. The chemical reaction which occurs between the electrolyte and the silver is then able to re-dissolve the silver coating. It can thus be said that the solution constituting the electrolyte is a self-erasing agent.

In order to obtain such a solution, it is necessary for the solvent to be oxidising. In this case it is generally standard procedure to use aqueous solvents which are sufficiently active to lead to a chemical re-dissolving of the silver coating.

However, such cells have various disadvantages due more particularly to the reactivity of the electrolyte which causes the formation of by-products in the solution, thus contaminating the solution and limiting the life.

According to the present invention, oxidising solutions are not used and to this end an organic solvent is employed which is inert relative to the deposited silver. Moreover, according to the invention, re-dissolving of the silver coating is performed electro-chemically and not chemically. As a result of this special combination of using a suitable salt and electro-chemical dissolving, it is possible to eliminate the danger of contamination because, as will be shown hereinafter, parasitic reactions which can occur at the end of the re-dissolving period are under the present conditions reversible, so that the product of said parasitic reactions re-decomposes into its initial components. The electrolyte composition then remains unchanged.

DESCRIPTION OF DRAWING AND PREFERRED EMBODIMENTS

The characteristics and advantages of the cell according to the invention can be gathered from the following description with reference to illustrative and non-limitative embodiments and the attached drawing which is a diagrammatic section of an electrolytic display cell.

In the drawing the cell comprises two parallel plates 2 and 4 maintained in place by a shim 6. Plate 2 is coated with a semi-transparent conductive deposit 8 forming the electrode and plate 4 by a counter-electrode 10. An electrolyte 12 is inserted between the electrodes. A layer 14 of insulating material makes it possible to draw alphanumeric characters. Electrode 8 and counter-electrode 10 are connected to a d.c. voltage source 16 via a double switch 18 making it possible to reverse the polarities of the voltages applied.

The secondary parasitic reaction which may appear at the end of dissolving a silver coating on electrode 8 raised to a positive potential generally occurs when the surge voltage exceeds 600 mV relative to a silver electrode Ag/Ag$^+$. The oxidation of the halide anion corresponds to the following reactions in the case of iodide and bromide:

$$2I^- \rightarrow I_2 + 2e$$

$$2Br^- \rightarrow Br_2 + 2e$$

Thus at the end of the dissolving period iodine (or bromine) can appear in the electrolyte. However, according to the basic feature of the invention the electrolyte used is such that the above secondary reactions are reversible and in the case of halides said reversibility is double. It is of an electro-chemical nature because the iodine (or bromine) is reduced when the active anode is again negatively polarised during a new silver deposition phase, in such a way that the halogen disappears from the solution in order to again give the halide anion. It is also of a chemical nature because when the cell is at rest the iodine (or bromine) present in the electrolyte reacts with the silver of the deposited coatings or with that of the counter-electrode to once again give a halide anion in accordance with the following reactions:

$$2Ag + I_2 \rightarrow 2Ag^+ + 2I^-$$

$$2Ag + Br_3 \rightarrow 2Ag^+ + 2Br^-$$

Due to the double reversibility characteristic of these reactions there is consequently a self-balancing of the electrolyte which is constantly regenerated in its initial composition, even if the dissolving of the silver coating leads to iodine or bromine formation.

The solvents used according to the invention are organic solvents. Such solvents have numerous advantages:

They are able to dissolve a large quantity of silver salts and optionally alkaline supporting salts;

they have a chemical inertia relative to the deposited metal and the materials constituting the transparent electrode;

they are electro-chemically stable under normal operating conditions of the cell and are consequently not subject to reactions which can cause an irreversible modification of the electrolyte;

they ensure that the $Ag^+$ ions have a sufficient mobility to permit high switching speeds even when the voltages applied are of the order of one volt.

Among the preferred organic solvents used according to the present invention, reference is made to acetonitrile, methyl or ethyl alcohol, a methyl or ethyl alcohol-acetonitrile mixture, glycerine, a propylene-carbonate-acetonitrile mixture, furfural etc.

The supporting salts which can be used with the metallic salt are alkali halides and more particularly sodium bromide and iodide. They aid the deposition of a silver film a few Angstroms thick and having a discontinuous structure on the transparent electrode. Said structure and said thickness gives such a deposit very interesting optical properties for the application of the display, and in particular a high absorption and relatively low reflection. These supporting salts also improve ionic conduction and facilitate the dissolving of the silver salts by complexing the $Ag^+$ ions.

It is obvious that inert pigments can be added to such electrolytes in order to improve the chromatic contrast by creating a diffuse background whose colour stands out relative to that of the displayed symbols. Such pigments can be titanium oxide $TiO_2$ or alumina $Al_2O_3$.

For purely explanatory purposes two examples of electrolyte compositions and the corresponding operating conditions are given below:

EXAMPLE 1

(a) Electrolyte

Solvent: ⅓ acetonitrile, ⅔ methyl-alcohol
Salts: AgI 40 g/l; NaI 240 g/l (b) Operating conditions Electrolyte film thickness: 200μ
Maximum voltage applied: 1 volt
Current density: 30 mA/cm$^2$
Deposition time: 15/100 sec.
Dissolving time: 18/100 sec.
Optical density variation obtained: approx. 0.3
Max. switching speed: 1 cycle per second
Life: several $10^6$ cycles.

EXAMPLE 2

(a) Electrolyte

Solvent: ⅓ acetonitrile, ⅔ methyl-alcohol
Salts: AgI 40 g/l; NaI 240 g/l
Pigments: $TiO_2$ powder of grain size close to 1 micron and of sufficient quantity to obtain a stable paste (b) Operating conditions Cell thickness: 150μ
Max. voltage: 1 V
Current density imposed: 20 mA/cm$^2$
Deposition time: 20/100 sec.
Dissolving time: 30/100 sec.
Optical density variation: approx. 0.3
Max. switching speed: 1 cycle per sec.
Life: several $10^6$ cycles.

What is claimed is:

1. An electrolytic display cell of the type comprising an electrolyte containing a metallic salt dissolved in a solvent, two parallel plates whereof one is covered by a semi-transparent electrode and whereof the other supports a counter-electrode, the electrode and counter-electrode being connected to the positive and negative poles of a d.c. voltage source via a switch permitting the connection of each pole to any one of the electrodes, the display being obtained by connecting the electrode to the negative pole of the source and the erasing by connecting the electrode to the positive pole, wherein the solvent is an organic solvent and the salt a silver halide.

2. A cell according to claim 1, wherein the halide is a bromide or an iodide.

3. A cell according to claim 2, wherein the electrolyte also comprises at least one alkali bromide or iodide supporting salt.

4. A cell according to claim 1, wherein the solvent is a mixture of acetonitrile and methyl-alcohol.

* * * * *